US012691673B2

(12) United States Patent
Kitaguchi et al.

(10) Patent No.: US 12,691,673 B2
(45) Date of Patent: Jul. 28, 2026

(54) LAMINATING SYSTEM, LAMINATING APPARATUS, AND RECORDING MEDIUM

(71) Applicant: Konica Minolta, Inc., Tokyo (JP)

(72) Inventors: Tatsuya Kitaguchi, Fussa (JP);
Mikihiro Yamakawa, Kodaira (JP)

(73) Assignee: KONICA MINOLTA, INC., Tokyo
(JP)

( * ) Notice: Subject to any disclaimer, the term of this
patent is extended or adjusted under 35
U.S.C. 154(b) by 227 days.

(21) Appl. No.: 18/462,573

(22) Filed: Sep. 7, 2023

(65) Prior Publication Data

US 2024/0083158 A1      Mar. 14, 2024

(30) Foreign Application Priority Data

Sep. 14, 2022    (JP) ................................. 2022-145884

(51) Int. Cl.
B32B 41/00        (2006.01)
B32B 38/00        (2006.01)
G03G 15/24        (2006.01)

(52) U.S. Cl.
CPC ........ B32B 38/145 (2013.01); B32B 38/0004
(2013.01); B32B 41/00 (2013.01); *B32B*
*2309/14* (2013.01)

(58) Field of Classification Search
USPC ....... 156/265, 277, 299, 360, 361, 362, 519,
156/522
See application file for complete search history.

(56) References Cited

U.S. PATENT DOCUMENTS

| | | | | |
|---|---|---|---|---|
| 4,544,590 A | * | 10/1985 | Egan ..................... | G09F 3/0288 |
| | | | | 428/912.2 |
| 5,429,576 A | * | 7/1995 | Doderer-Winkler .... | B31B 70/00 |
| | | | | 229/80.5 |
| 8,517,075 B2 | * | 8/2013 | Shanton .................. | B29C 65/52 |
| | | | | 156/557 |
| 2006/0260754 A1 | * | 11/2006 | Crum ..................... | B31D 1/021 |
| | | | | 156/379 |

FOREIGN PATENT DOCUMENTS

| | | | | | |
|---|---|---|---|---|---|
| GB | 2164915 A | * | 4/1986 | ............ | B31D 1/021 |
| JP | 1994-023689 A | | 2/1994 | | |
| JP | 2003-127237 A | | 5/2003 | | |
| JP | 2009-073668 A | | 4/2009 | | |
| JP | 2016-014787 A | | 1/2016 | | |

OTHER PUBLICATIONS

English machine translation of JP 2820733 B2; Nov. 5, 1998;
G03G2215/00949; 20 pages. (Year: 1998).*
Office Action, dated Mar. 31, 2026, which was issued for the
corresponding Japanese Patent Application No. 2022-145884, 8
pages, with English translation.

* cited by examiner

*Primary Examiner* — Linda L Gray
(74) *Attorney, Agent, or Firm* — LUCAS & MERCANTI,
LLP

(57)        ABSTRACT

A laminating system includes: a laminator that performs a
laminating process by overlaying a film on a plurality of
sheets conveyed; and a hardware processor that, before the
laminating process, adjusts an interval between sheets, the
interval varying in an image former, such that a leading end
and a trailing end of the sheets conveyed from the image
former are superposed or the interval between the sheets
conveyed from the image former is reduced.

17 Claims, 6 Drawing Sheets

SHEET CONVEYANCE
DIRECTION

P21          P22          P23          P24          P25          P26

SHEET CONVEYANCE
DIRECTION

P31          P32          P33          P34          P35          P36

LAMINATING SYSTEM, LAMINATING APPARATUS, AND RECORDING MEDIUM

CROSS-REFERENCE TO RELATED APPLICATIONS

The entire disclosure of Japanese Patent Application No. 2022-145884 filed on Sep. 14, 2022 is incorporated herein by reference in its entirety.

BACKGROUND

Technical Field

The present invention relates to a laminating system, a laminating apparatus, and a recording medium.

Description of the Related Art

A laminating apparatus that covers a printed material with a transparent resin film has been used. For example, a laminating apparatus using a long laminating member having an adhesive layer is known. In this laminating apparatus, the laminating member is continuously supplied in a longitudinal direction. The laminating apparatus transports sheets (recording media) such as paper sequentially transported from an upstream side with a laminating member superposed thereon, and continuously laminates the sheets.

In particular, there is a hot laminator that causes a laminating member and a sheet to adhere to each other while a heating section is compressing and heating them. By using the hot laminator, the laminating member is brought into close contact with the sheet, so that the gloss of the sheet surface becomes uniform, and a high-quality output product is obtained.

As such a laminating apparatus, for example, Japanese Unexamined Patent Publication No. H 06-023689 discloses a configuration in which a trailing end of a preceding sheet and a leading end of a following sheet coincide, of sheets that are continuously transported. Accordingly, the adhesive applied to the laminating member is prevented from directly coming into contact with the sheet conveyance section.

Further, Japanese Unexamined Patent Publication No. 2009-73668 has proposed a technology for controlling the conveyance speeds and timings of a preceding sheet and a following sheet in a laminating apparatus connected to an image forming apparatus. This laminating apparatus has a mechanism for reducing an interval between sheets conveyed one by one having the interval and conveying the sheets while making the trailing end of a preceding sheet and the leading end of a following sheet coincide. As a result, even in a case where the laminating apparatus is connected to the image forming apparatus, a continuous laminating process can be performed.

SUMMARY

However, in the image forming apparatus on the upstream side of the laminating apparatus, the sheet interval which should be originally uniform may vary. For example, in a case where a slip of a sheet, speed fluctuation of a conveyance motor, or the like occurs in the conveyance section, the sheet interval varies. Alternatively, the sheet interval varies, for example, in a case where a correction operation or the like is performed even for a short time, for image maintenance during formation of images on a plurality of sheets. The correction operation or the like includes a toner forcible discharge process in which a predetermined patch is formed between images, and a toner concentration adjustment process. Furthermore, in the image forming apparatus, in a case where image input is delayed due to a communication status inside or outside of the apparatus, a sudden extension occurs in the sheet interval.

Due to such a variation in the sheet interval, the sheets that are continuously transported cannot be overlapped, and the laminating process may be performed in a state in which there is a gap between sheets. In this case, since there is a gap between sheets, the adhesive applied to the laminating member (film) comes into contact with not the sheets but a conveyance roller or a pressure roller. For this reason, the conveyance-related members may be damaged or the laminating member may be wound around the roller, so that the apparatus may stop. Alternatively, if the overlapping portion of sheets is too much, images on the sheets may have non-laminated portions.

The present invention has been made in view of the above-mentioned problems in the conventional technique. Objects of the present invention include, in a case where a laminating process is performed on sheets that are continuously conveyed, performing the laminating process on the sheets reliably even if an interval between sheets varies in an image forming apparatus or the like.

To achieve at least one of the abovementioned objects, according to an aspect of the present invention, there is provided a laminating system comprising:

a laminator that performs a laminating process by overlaying a film on a plurality of sheets conveyed; and a hardware processor that, before the laminating process, adjusts an interval between sheets, the interval varying in an image former, such that a leading end and a trailing end of the sheets conveyed from the image former are superposed or the interval between the sheets conveyed from the image former is reduced.

To achieve at least one of the abovementioned objects, according to another aspect of the present invention, there is provided a laminating system comprising:

a laminator that performs a laminating process by overlaying a film on a plurality of sheets conveyed;

a first conveyor that conveys the plurality of sheets in a state in which an interval between the plurality of sheets during a job for image formation by an image former is not uniform; and a second conveyor that is disposed downstream of the first conveyor and conveys the plurality of sheets before the laminating process in a state in which a leading end and a trailing end of sheets conveyed from the first conveyor are superposed or in a state in which the interval between the sheets conveyed from the first conveyor is reduced.

To achieve at least one of the abovementioned objects, according to another aspect of the present invention, there is provided a laminating system comprising:

a laminator that performs a laminating process by overlaying a film on a plurality of sheets conveyed; and a hardware processor that controls a conveyance speed of the plurality of sheets before the laminating process in accordance with an interval between sheets during a job such that a leading end and a trailing end of the sheets conveyed from an image former are superposed or the interval between the sheets conveyed from the image former is reduced.

To achieve at least one of the abovementioned objects, according to another aspect of the present invention, there is provided a laminating apparatus connectable with an image forming apparatus, comprising:

a laminator that performs a laminating process by overlaying a film on a plurality of sheets conveyed; and a hardware processor that, before the laminating process, adjusts an interval between sheets, the interval varying in an image former of the image forming apparatus, such that a leading end and a trailing end of the sheets conveyed from the image former are superposed or the interval between the sheets conveyed from the image former is reduced.

To achieve at least one of the abovementioned objects, according to another aspect of the present invention, there is provided a laminating apparatus connectable with an image forming apparatus, comprising:

a laminator that performs a laminating process by overlaying a film on a plurality of sheets conveyed; and a hardware processor that controls a conveyance speed of the plurality of sheets before the laminating process in accordance with an interval between sheets during a job such that a leading end and a trailing end of the sheets conveyed from an image former of the image forming apparatus are superposed or the interval between the sheets conveyed from the image former is reduced.

To achieve at least one of the abovementioned objects, according to another aspect of the present invention, there is provided a non-transitory recording medium storing a computer readable program that causes a computer that controls a laminating apparatus connectable with an image forming apparatus and including a laminator that performs a laminating process by overlaying a film on a plurality of sheets conveyed, to:

before the laminating process, adjust an interval between sheets, the interval varying in an image former of the image forming apparatus, such that a leading end and a trailing end of the sheets conveyed from the image former are superposed or the interval between the sheets conveyed from the image former is reduced.

To achieve at least one of the abovementioned objects, according to another aspect of the present invention, there is provided a non-transitory recording medium storing a computer readable program that causes a computer that controls a laminating apparatus connectable with an image forming apparatus and including a laminator that performs a laminating process by overlaying a film on a plurality of sheets conveyed, to:

control a conveyance speed of the plurality of sheets before the laminating process in accordance with an interval between sheets during a job such that a leading end and a trailing end of the sheets conveyed from an image former of the image forming apparatus are superposed or the interval between the sheets conveyed from the image former is reduced.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention, wherein.

DETAILED DESCRIPTION

Below, with reference to the drawings, embodiments of a laminating system, a laminating apparatus, and a recording medium according to the present invention will be described. However, the scope of the invention is not limited to the disclosed embodiments.

[Configuration of Image Forming System]

Figure 1:
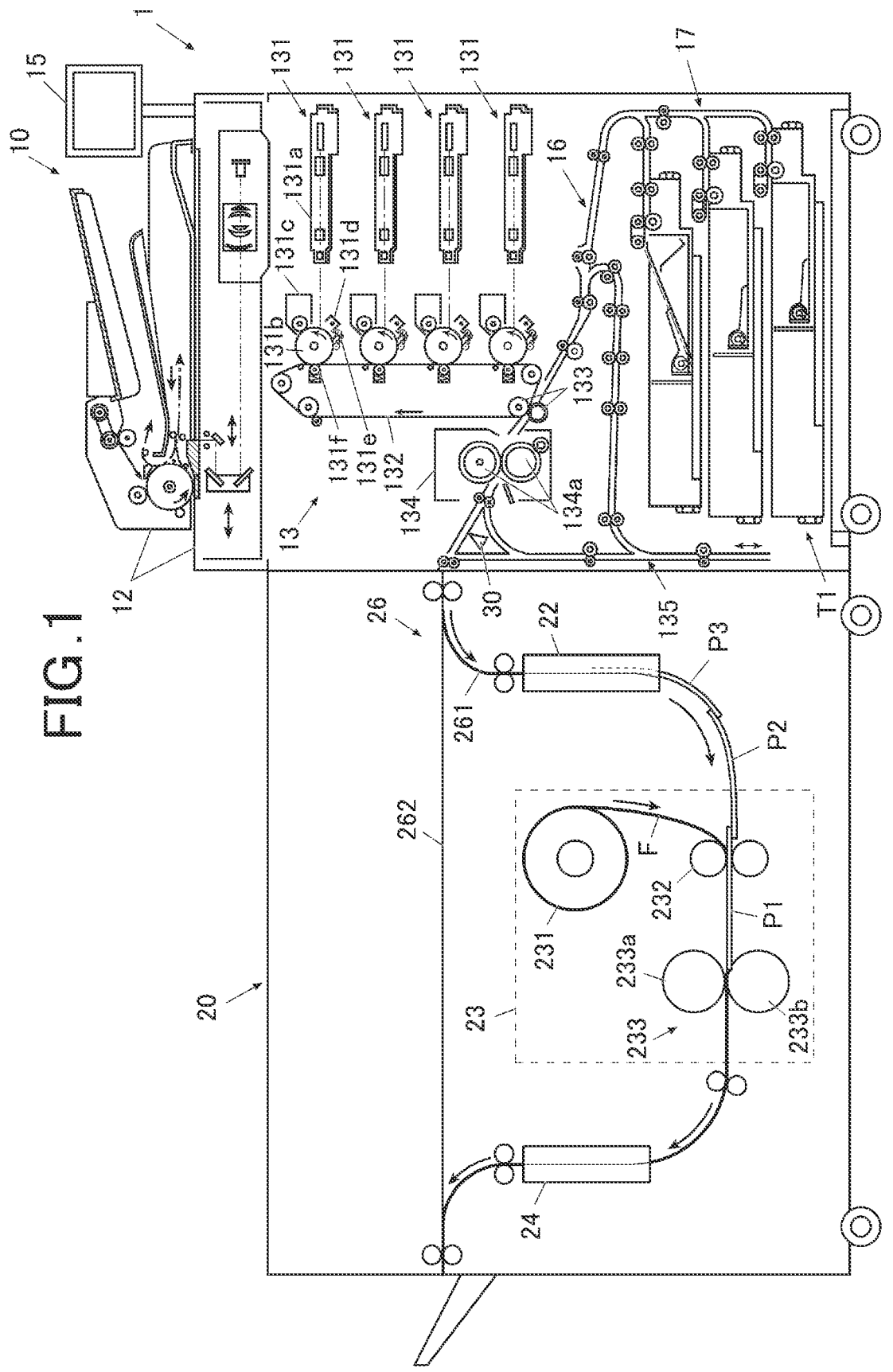
FIG. 1 is a schematic diagram illustrating an image forming system according to an embodiment of the present invention.
Figure 2:
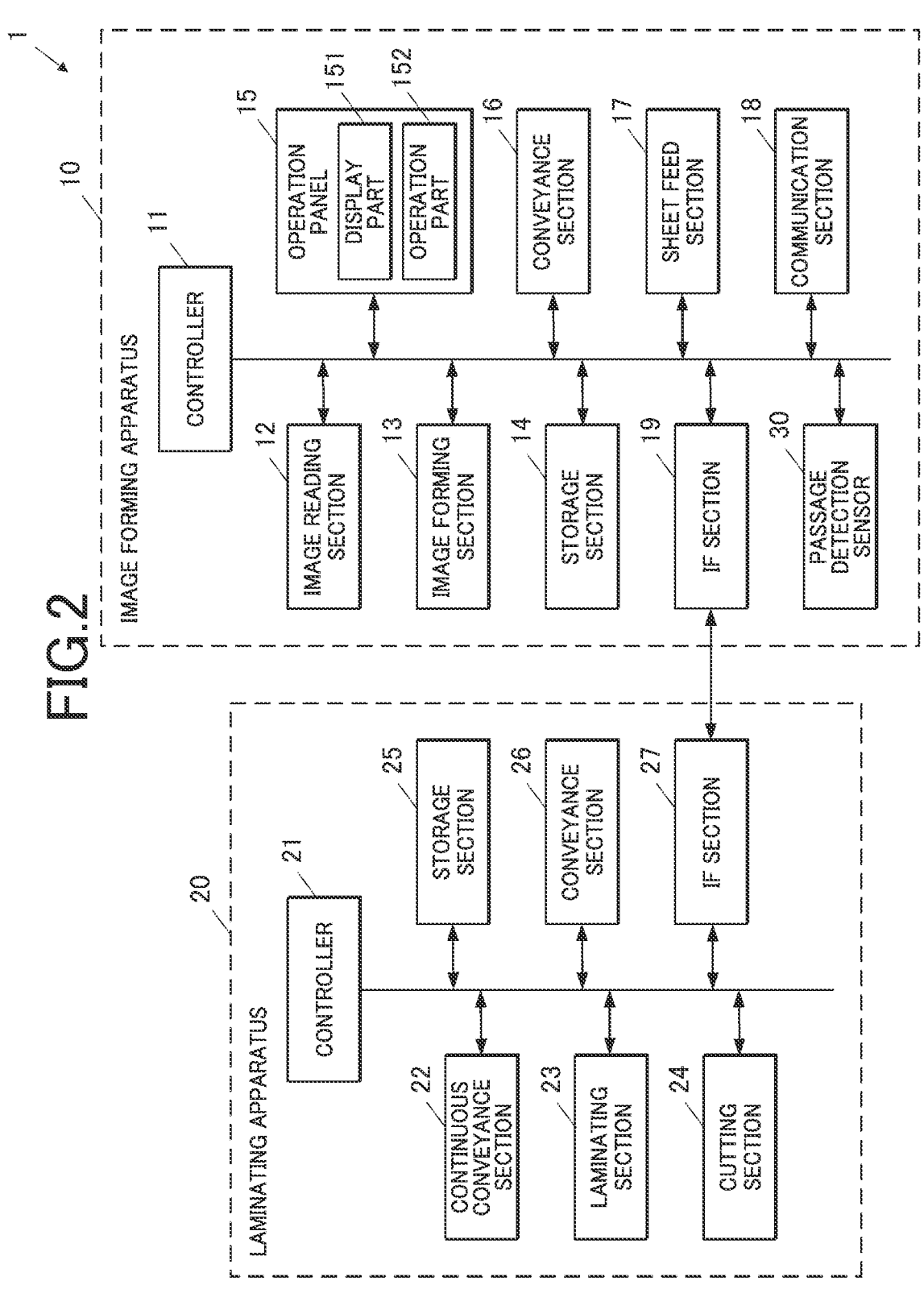
FIG. 2 is a block diagram showing a functional configuration of the image forming system.

FIG. 1 is a schematic configuration diagram of an image forming system 1 as a laminating system in a present embodiment. FIG. 2 is a block diagram showing a functional configuration of the image forming system 1. The image forming system 1 includes an image forming apparatus 10 and a laminating apparatus 20.

The image forming apparatus 10 forms an image on a sheet of paper serving as a sheet. The image forming apparatus 10 is connected to the laminating apparatus 20. The image forming apparatus 10 continuously delivers a plurality of sheets after image formation to the laminating apparatus 20.

The laminating apparatus 20 performs a laminating process on the sheet(s) on which the image(s) is formed in the image forming apparatus 10.

The image forming apparatus 10 includes a controller 11, an image reading section 12, an image forming section 13 (image former), a storage section 14, an operation panel 15 (a display part 151 and an operation part 152), a conveyance section 16, a sheet feed section 17, a communication section 18, an interface (IF) section 19, a passage detection sensor 30, and the like.

The controller 11 includes a central processing unit (CPU), a random access memory (RAM), a read only memory (ROM), and the like. The CPU reads a program of various programs stored in the ROM in response to an operation signal input from the operation part 152 or an instruction signal received by the communication section 18 or the IF section 19. The CPU loads the read various programs to the RAM and integrally controls the operation of the image forming apparatus 10 in cooperation with the various programs loaded to the RAM.

The image reading section 12 scans and exposes an image of a document placed on a document plate or an auto document feeder (ADF) by an optical system of a scanning exposure device. The image reading section 12 obtains an image signal by reading reflected light from an image of a document using a line image sensor. The image signal is subjected to processing such as analog-to-digital (A/D) conversion, shading correction, and compression, and is then input to the controller 11 as image data.

The image forming section 13 forms an image on a sheet by an electrophotographic method based on image data read by the image reading section 12 or image data received from an external apparatus. That is, the image forming section 13 forms a toner image on a sheet. The image forming section 13 forms an image composed of four colors of C, M, Y, and K on a sheet in accordance with the pixel values of four colors of each pixel of the image data.

As shown in FIG. 1, the image forming section 13 includes four writing sections 131, an intermediate transfer belt 132, a secondary transfer roller 133, and a fixing section 134.

Four writing sections 131 are arranged in series (tandem) along the belt plane of the intermediate transfer belt 132. Each writing section 131 forms an image of C, M, Y, or K. The writing sections 131 form images in different colors, but the writing sections 131 have the same configuration. Each of the writing sections 131 includes an optical scanning section 131a, a photoreceptor 131b, a developing section 131c, a charging section 131d, a cleaning section 131e, and a primary transfer roller 131f.

In image formation, the charging section 131d charges the photoreceptor 131b in each writing section 131. Thereafter, the optical scanning section 131a scans the photoreceptor 131b with the light flux emitted based on image data and forms an electrostatic latent image. When the developing section 131c supplies toner and develops the image, an image (monochrome toner image) is formed on the photoreceptor 131b.

The primary transfer rollers 131f of the four writing sections 131 sequentially transfer images formed on the photoreceptors 131b to the intermediate transfer belt 132 so that the images are superimposed (primary transfer). Thus, an image of the colors (color toner image) is formed on the intermediate transfer belt 132. The intermediate transfer belt 132 is an image bearing member that is wound around a plurality of rollers to rotate. After the primary transfer, the cleaning section 131e removes the toner remaining on the photoreceptor 131b.

In the image forming section 13, a sheet is supplied from a sheet feed tray T1 in synchronization with the timing at which the image on the rotating intermediate transfer belt 132 reaches the position of the secondary transfer roller 133. The secondary transfer roller 133 includes a pair of rollers. A first roller of the secondary transfer roller 133 comes into pressure-contact with the intermediate transfer belt 132. A second roller of the secondary transfer roller 133 is one of a plurality of rollers around which the intermediate transfer belt 132 is wound. The pressure contact of the secondary transfer roller 133 causes the image (color toner image) to be transferred (secondarily transferred) onto the sheet from the intermediate transfer belt 132. Thereafter, the sheet is conveyed to the fixing section 134 where a fixing process is performed. The fixing process is a process of fixing an image on a sheet by heating and pressing the sheet with a fixing roller(s) 134a. When images are formed on both sides of the sheet, the sheet is conveyed to an inversion path 135, and the sheet is inverted. Thereafter, the sheet is fed again to the position of the secondary transfer roller 133.

The storage section 14 is a nonvolatile storage means constituted by a hard disk drive (HDD), a solid state drive (SSD), or the like. The storage section 14 stores various programs, various setting data, and the like in a readable and writable manner from the controller 11.

The operation panel 15 includes a display part 151 that displays various kinds of information to a user, and an operation part 152 that receives an operation input from the user.

The display part 151 may be, for example, a color liquid crystal display (LCD). The display part 151 displays an operation screen and the like in accordance with a display control signal input from the controller 11. The operation screen or the like includes various setting screens, various buttons, an operation status of each function, and the like.

The operation part 152 includes a touch screen provided on the screen of the display part 151 and various hard keys arranged around the screen of the display part 151. When a button displayed on the screen is pressed by a finger, a touch pen, or the like, the operation part 152 detects coordinates of the pressed position by a voltage value and outputs an operation signal associated with the detected position to the controller 11. Note that the touch screen is not limited to a pressure-sensitive type, and may be, for example, an electrostatic type or an optical type. When a hard key is pressed, the operation part 152 outputs an operation signal associated with the pressed key to the controller 11.

The conveyance section 16 includes a plurality of pairs of rollers. The conveyance section 16 conveys a sheet supplied by the sheet feed section 17 to the image forming section 13. The conveyance section 16 conveys the sheet on which an image has been formed by the image forming section 13 to the laminating apparatus 20.

In a state in which intervals between a plurality of sheets during one job for image formation by the image forming section 13 are not uniform, the conveyance section 16 can convey the plurality of sheets. That is, the conveyance section 16 in a sheet conveyance path downstream of the image forming section 13 functions as a first conveyance section (first conveyor).

The sheet feed section 17 includes a sheet feed tray T1. The sheet feed section 17 feeds a sheet from the sheet feed tray T1 to the image forming section 13. In each sheet feed tray T1, sheets of a paper type and a size predetermined for each sheet feed tray T1 are stored.

The communication section 18 is an interface that connects the image forming apparatus 10 to a communication network. The communication section 18 has a communication integrated circuit (IC), a communication connector, and the like. The communication section 18 transmits and receives various kinds of information to and from an external apparatus connected to the communication network using a predetermined communication protocol under the control of the controller 11. The communication section 18 can also input and output various kinds of information via a universal serial bus (USB).

The IF section 19 is an interface for transmitting and receiving data between the image forming apparatus and the laminating apparatus 20.

The passage detection sensor 30 is disposed on the sheet conveyance path downstream of the fixing section 134 of the image forming section 13 and upstream of a continuous conveyance section 22 of the laminating apparatus 20. The passage detection sensor 30 detects passage of the sheet that is conveyed on the sheet conveyance path, and outputs the detection result to the controller 11. As the passage detection sensor 30, a photosensor or the like can be used.

The controller 11 transmits the detection results of the sheets by the passage detection sensor 30 to the laminating apparatus 20 via the IF section 19.

An interval between sheets ejected from the image forming apparatus 10 varies by at least one of a toner forcible discharge process, a toner concentration adjustment process and an image input delay in the image forming apparatus 10.

The toner forcible discharge process is a process to prevent deterioration of toner by discharging toner in the developing section 131c of the writing section 131 of each color. The toner staying in each developing section 131c is stirred for a long time and is rubbed by other toner, carriers, and the like, and thus deteriorates, and the charging amount decreases. In the toner forcible discharge process, the controller 11 discharges the toner in each developing section 131c by forming a predetermined patch on the intermediate transfer belt 132.

The toner forcible discharge process is performed in a case where images having a low coverage ratio continue, or the like. When the coverage ratio is low, the toner(s) stays and deteriorates. Therefore, in a case where the toner cannot be discharged enough at normal sheet intervals, the controller 11 forms the patch by extending the interval(s) between sheets.

The toner concentration adjustment process is a process to stabilize image density. In the toner concentration adjustment process, first, the controller 11 changes the development output of the developing section 131c of the writing section 131 of each color to form a plurality of toner concentration detection patches having different toner concentrations on the intermediate transfer belt 132. The controller 11 obtains the toner concentration of each color on the intermediate transfer belt 132 detected by a concentration sensor (not illustrated). The controller 11 feeds back, according to the detection result, to the development output of the developing section 131c corresponding to each color, and thereby performs control so that stable toner concentration is always obtained during image formation.

The toner concentration adjustment process is executed at predetermined intervals (the number of sheets, time, and the like). The adjustment process of the toner concentration is executed when a power switch of the image forming apparatus 10 is turned on, when the toner cartridge is replaced, or the like. In the toner concentration adjustment process, it is necessary to make the interval between sheets slightly less than one sheet.

The image input delay is a delay of input of an image from a printer driver, a printer controller, or the like when an image is formed based on image data received from an external apparatus. In a case where input of an image is slow, such as a case where an image size is large, an interval between images increases correspondingly.

The laminating apparatus 20 includes a controller 21, a continuous conveyance section 22, a laminating section 23 (laminator), a cutting section 24, a storage section 25, a conveyance section 26, an IF section 27, and the like.

The controller 21 includes a CPU, a RAM, a ROM, and the like. The CPU reads a program of various programs stored in the ROM in response to an instruction signal received from the image forming apparatus 10 by the IF section 27. The CPU loads the read various programs to the RAM, and integrally controls the operation of the laminating apparatus 20 in cooperation with the various programs loaded to the RAM.

The continuous conveyance section 22 is disposed upstream of the laminating section 23 in the sheet conveyance path.

The continuous conveyance section 22 stacks the leading end and the trailing end of sheets transported from the image forming section 13 of the image forming apparatus 10. Specifically, the continuous conveyance section 22 conveys sheets in a continuous belt shape such that the trailing end portion of a preceding sheet is superposed on the upper portion of the leading end portion of a following sheet by a predetermined amount. For example, as illustrated in FIG. 1, the continuous conveyance section 22 conveys sheets P1 and P2 such that the trailing end of the sheet P1 slightly (by a predetermined amount) overlaps the upper portion of the leading end of the sheet P2. The continuous conveyance section 22 conveys sheets P2 and P3 so that the trailing end of the sheet P2 slightly overlaps the upper portion of the leading end of the sheet P3.

The continuous conveyance section 22 is located downstream of the conveyance section 16 (first conveyance section) located downstream of the image forming section 13 of the image forming apparatus 10. The continuous conveyance section 22 conveys the plurality of sheets in a state where the leading ends and the trailing ends of the sheets conveyed from the first conveyance section are superposed before the laminating process. That is, the continuous conveyance section 22 functions as a second conveyance section (second conveyor).

The laminating section 23 performs a laminating process by stacking the film F on a plurality of sheets to be conveyed. The laminating section 23 performs a laminating process by stacking a film F (laminate film) having an adhesive layer on a plurality of sheets. The laminating section 23 continuously pastes a film F onto a side (front side) of the sheets overlapped by the continuous conveyance section 22, the side on which images have been formed by the image forming apparatus 10. That is, the laminating section 23 performs the laminating process on only one side of the sheets.

The laminating section 23 includes a film roll 231, a bonding section 232, a laminate fixing section 233 (laminate fixer), and the like.

The film roll 231 is a roll of a film F including a transparent resin film layer and an adhesive layer. A hot-melt adhesive is applied to one side (the side that comes into contact with the sheets) of the film F to form an adhesive layer.

The film F is conveyed from the film roll 231 to a nip portion of the bonding section 232.

The bonding section 232 includes a pair of rollers. The bonding section 232 sandwiches the sheet and the film F at a nip portion formed by the pair of rollers, thereby bonding the adhesive layer of the film F to the surface of the sheet. As a result, the sheet and the film F are bonded together. Since the continuous conveyance section 22 superposes the leading end and the trailing end of the sheets that are continuously transported, the adhesive applied to the film F is prevented from coming into contact with anything other than the sheets in the path after the bonding section 232.

The laminate fixing section 233 applies at least one of heat and pressure to the film F and the sheet overlapped to integrate the film F and the sheet.

In the present embodiment, the laminate fixing section 233 includes a heating roller 233a and a pressure roller 233b. The laminate fixing section 233 applies heat/pressure to the sheet and the film F bonded by the bonding section 232, to fix the film F on the sheet.

The heating roller 233a has a halogen heater or the like built-in, and heats the film F and the sheet in an overlapped state.

The pressure roller 233b is pressed against the heating roller 233a by being urged upward by an urging member (not illustrated) such as a spring. Thus, a nip portion where the heating roller 233a and the pressure roller 233b are in surface-contact with each other is formed.

The heating roller 233a and the pressure roller 233b melt the adhesive layer of the film F, adhere the melted adhesive layer to the surface of the sheet, and perform thermocompression bonding.

The cutting section 24 is provided downstream of the laminating section 23 in the sheet conveyance path. The cutting section 24 cuts only the film F between the sheets which are continuously transported in a state where the film F is overlapped.

Figure 3:
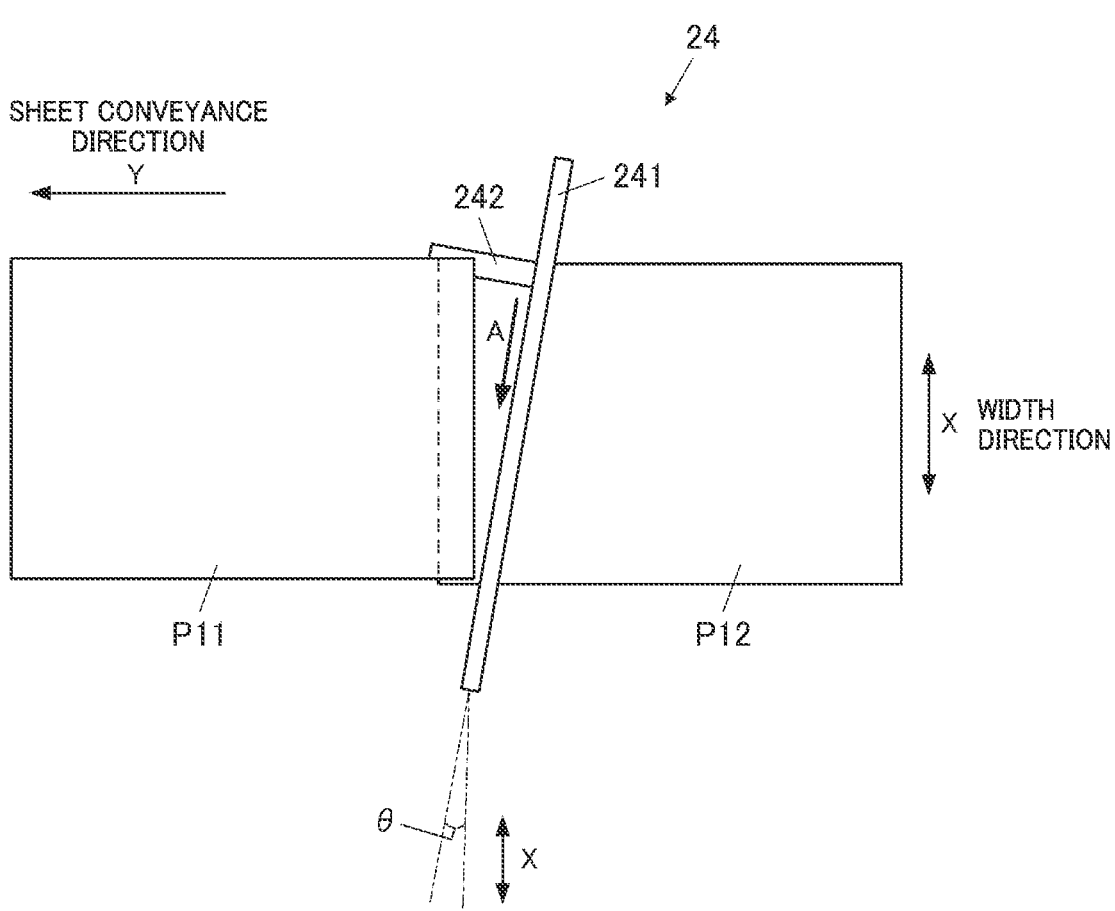
FIG. 3 is a schematic configuration diagram of a cutting section.

FIG. 3 illustrates a schematic configuration of the cutting section 24. In FIG. 3, the preceding sheet P11 and the following sheet P12 are conveyed in the sheet conveyance direction Y in a state where the trailing end of the preceding sheet P11 is superposed on the leading end of the following sheet P12.

The cutting section 24 includes a guide member 241 extending in a width direction X perpendicular to the sheet conveyance direction Y, a cutter 242, and a movement mechanism (not illustrated) that moves the cutter 242 along the guide member 241. In practice, the guide member 241 is provided along a direction A that forms a predetermined angle θ with the width direction X of the sheet.

The cutting section 24 inserts the cutter 242 between sheets that are continuously transported (between the trailing end of the preceding sheet P11 and the leading end of the following sheet P12). The cutting section 24 cuts the film F by moving the cutter 242 in the width direction X (actually, the direction A) of the sheet. The cutting section 24 inserts the cutter 242 between the sheets (cut sheets) overlapped by the continuous conveyance section 22 and cuts the film F along the edge of the trailing end of the preceding sheet P11 to separate the preceding sheet P11 and the following sheet P12. That is, the sheets connected by being bonded to the film F are returned to cut sheets by the film F between the sheets being cut.

Note that in order to ensure productivity, conveyance of the sheet(s) continues even when the film F is cut. In a case where the sheet and the film F are transported, the overlapping portion of the sheets (the cutting position of the film F) also moves. Therefore, it is necessary to move the position of the cutter 242 in the sheet conveyance direction Y in conjunction with the movement of the sheet. The guide member 241 is provided diagonally with respect to the width direction X so that as the cutter 242 traverses in the width direction X of the sheet, it moves further downstream in the sheet conveyance direction Y. The guide member 241 is provided so that an angle formed by the guide member 241 and the width direction X is an angle θ.

In a state where the preceding sheet P11 and the following sheet P12 are being conveyed in the sheet conveyance direction Y, the cutting section 24 separates the preceding sheet P11 and the following sheet P12. Therefore, the movement speed of the cutter 242 along the guide member 241 is adjusted in accordance with the conveyance speed of the preceding sheet P11 and the following sheet P12 in the sheet conveyance direction Y. The movement speed of the cutter 242 is adjusted so that the amount of displacement in the sheet conveyance direction Y when the cutter 242 moves along the guide member 241 matches the distance by which the sheet is conveyed while the cutter 242 moves across the sheet width.

The storage section 25 is a non-volatile storage means including an HDD and/or an SSD. The storage section 25 stores various programs, various setting data, and the like in a readable and writable manner from the controller 21.

The conveyance section 26 includes a plurality of pairs of rollers. The conveyance section 26 conveys, in the laminating apparatus 20, a sheet conveyed from the image forming apparatus 10. In a case where the sheet is subjected to the laminating process, the conveyance section 26 transports the sheet to the continuous conveyance section 22, the laminating section 23, and then the cutting section 24, via the conveyance path 261 (refer to FIG. 1), and ejects the sheet subjected to the laminating process to the outside. In a case where the laminating process is not performed on the sheet, the conveyance section 26 transports the sheet through the conveyance path 262 (refer to FIG. 1). The conveyance path 262 does not pass through the continuous conveyance section 22, the laminating section 23, and the cutting section 24.

The IF section 27 is an interface for transmission and reception of data between the laminating apparatus and the image forming apparatus 10.

The controller 21 (hardware processor) controls the continuous conveyance section 22 to adjust the interval between the sheets, which varies in the image forming section 13, before the laminating process so that the leading ends and the trailing ends of the sheets conveyed from the image forming section 13 are superposed.

Before the laminating process, the controller 21 controls the continuous conveyance section 22 to control the conveyance speed(s) of the plurality of sheets in accordance with the interval between the sheets during the job such that the leading end(s) and the trailing end(s) of the sheets conveyed from the image forming section 13 are superposed.

The controller 21 adjusts at least one of the conveyance speed of the preceding sheet and the conveyance speed of the following sheet as the adjustment of the interval between the sheets in the continuous conveyance section 22. Specifically, the controller 21 adjusts the rotation speed of the conveyance rollers included in the continuous conveyance section 22 to convey each sheet.

In a case where the distance/interval between the sheets is larger than a predetermined interval/distance (normal interval/distance), the controller 21 executes at least one of control for decreasing the conveyance speed of the preceding sheet and control for increasing the conveyance speed of the following sheet.

When the interval between the sheets is shorter/smaller than a predetermined interval (normal interval), the controller 21 executes at least one of control for increasing the conveyance speed of the preceding sheet and control for decreasing the conveyance speed of the following sheet.

The controller 21 acquires the interval between the preceding sheet and the following sheet. Specifically, the controller 21 receives the detection result of the sheets by the passage detection sensor 30 from the image forming apparatus 10 via the IF section 27. The controller 21 acquires the interval between the preceding sheet and the following sheet based on the detection results of the sheets by the passage detection sensor 30.

The controller 21 adjusts the interval between the sheets in accordance with the acquired interval between the preceding sheet and the following sheet.

When the controller 21 has adjusted the conveyance speed of the preceding sheet, the controller 21 instructs the cutting section 24 to adjust the movement speed of the cutter 242 in the width direction X of the sheet.

When the interval between the sheets conveyed from the image forming section 13 returns to the normal interval, the controller 21 returns the conveyance speed(s) of the plurality of sheets and the movement speed of the cutter 242 to their normal speeds.

[Operation of Image Forming System]

Next, operation of the image forming system 1 will be described.

Figure 4:
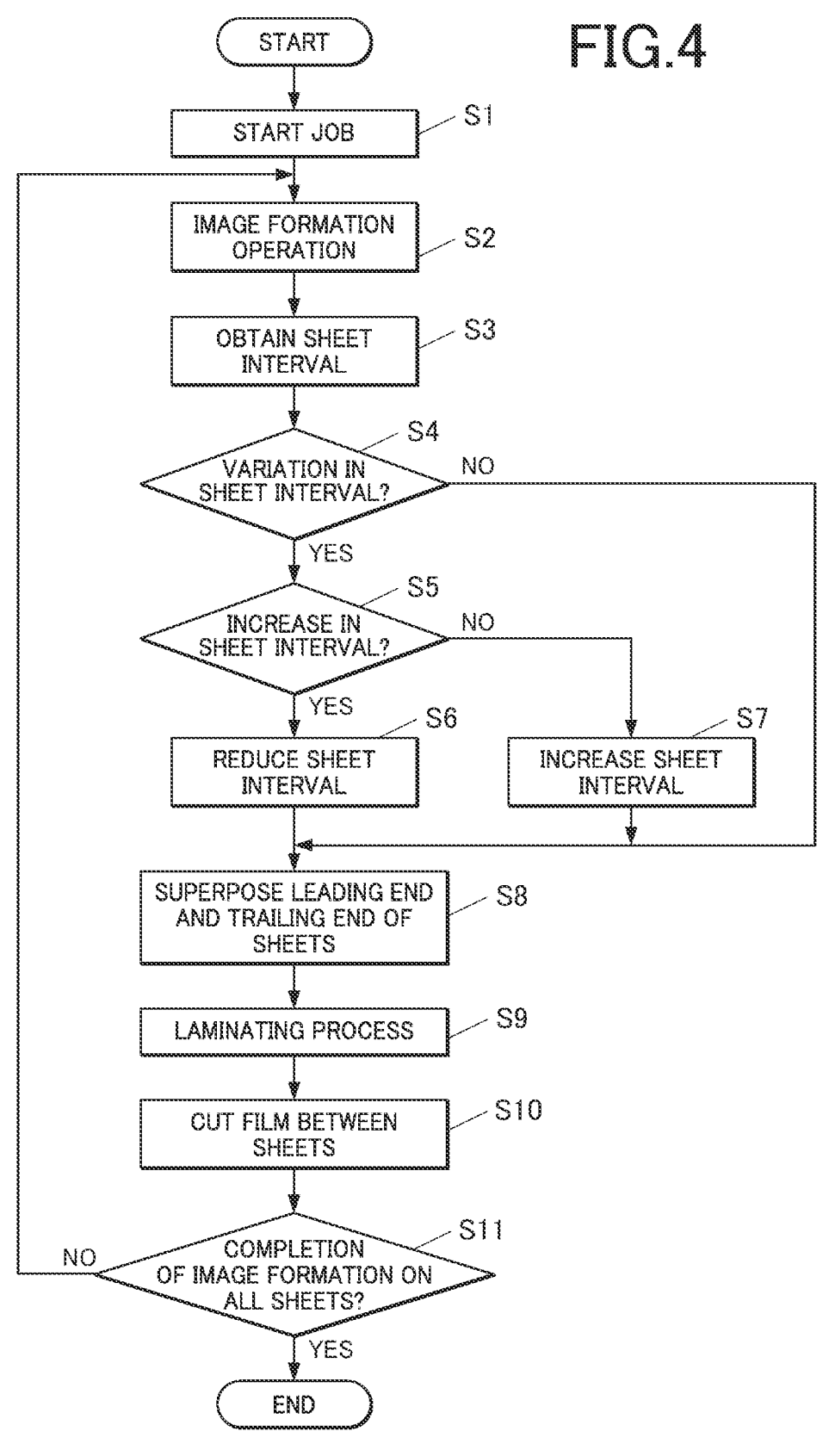
FIG. 4 is a flowchart illustrating a sheet interval adjustment process executed in the image forming system.

FIG. 4 is a flowchart illustrating a sheet interval adjustment process executed in the image forming system 1.

First, the controller 11 of the image forming apparatus 10 starts a job (step S1). The data of the job may be data received from the external apparatus via the communication section 18 or data generated based on an operation instruction from the operation part 152. The job includes a laminating process.

Next, the controller 11 causes the image forming section 13 to perform the image forming operation based on the data of the job (step S2).

Next, the controller 11 acquires, from the passage detection sensor 30, detection results of detection of passage of sheets (a preceding sheet and a following sheet) continuously conveyed on the sheet conveyance path. The controller 11 transmits the detection results of the sheets by the passage detection sensor 30 to the laminating apparatus via the IF section 19.

The controller 21 of the laminating apparatus 20 receives the detection results of the sheets by the passage detection sensor 30 from the image forming apparatus 10 via the IF section 27. The controller 21 acquires the interval between the preceding sheet and the following sheet based on the detection results of the sheets by the passage detection sensor 30 (step S3). For example, the controller 21 calculates the interval between the preceding sheet and the following sheet based on a timing at which the trailing end of the preceding sheet passes and a timing at which the leading end of the following sheet passes.

Next, the controller 21 determines whether or not there has been a variation in the interval (sheet interval) between the preceding sheet and the following sheet when passing through the passage detection sensor 30 (step S4). The variation of the sheet interval is determined by comparison with a predetermined normal interval. The normal interval is stored in the storage section 25.

If the sheet interval has varied (YES in step S4), the controller 21 determines whether or not the sheet interval has increased as compared with the normal interval (step S5).

If the sheet interval is larger than the normal interval (YES in step S5), the controller 21 reduces the sheet interval (step S6). Specifically, the controller 21 controls the continuous conveyance section 22 to decrease the conveyance speed of the preceding sheet, to increase the conveyance speed of the following sheet, or to do both.

Figure 5:
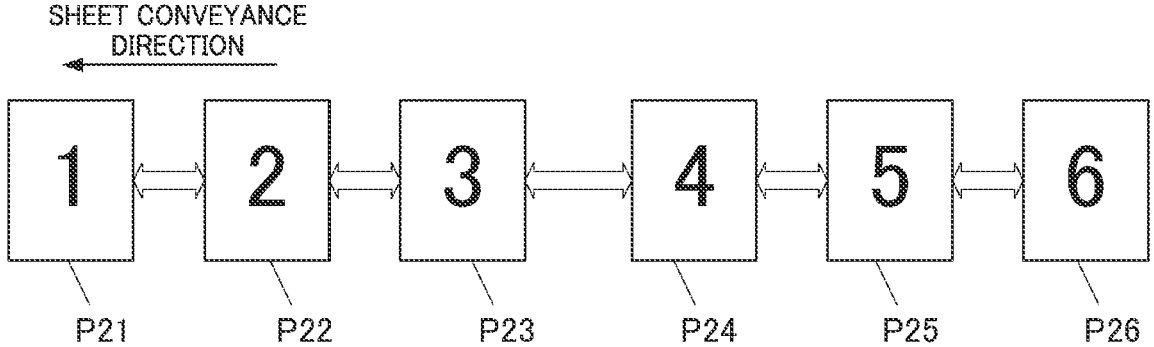
FIG. 5 shows an example of a case where an interval between sheets is larger than a normal interval.

For example, as illustrated in FIG. 5, regarding the continuously conveyed sheets P21 to P26, when the interval between the sheets P23 and P24 is larger than usual, the controller 21 absorbs the difference in the sheet interval by decreasing the conveyance speed of the sheet P23 or increasing the conveyance speed of the sheet P24.

In step S5, when the sheet interval becomes shorter than usual (step S5; NO), the controller 21 makes an adjustment so as to increase the sheet interval (step S7). Specifically, the controller 21 controls the continuous conveyance section 22 to increase the conveyance speed of the preceding sheet, to decrease the conveyance speed of the following sheet, or to do both.

Figure 6:
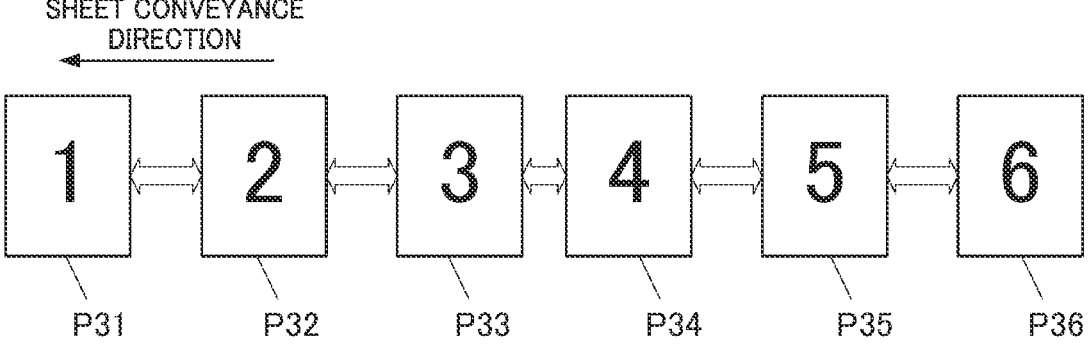
FIG. 6 shows an example of a case where an interval between sheets is smaller than the normal interval.

For example, as shown in FIG. 6, regarding the continuously conveyed sheets P31 to P36, when the interval between the sheets P33 and P34 becomes smaller than usual, the controller 21 absorbs the difference in the sheet interval by increasing the conveyance speed of the sheet P33 or decreasing the conveyance speed of the sheet P34.

If the sheet interval has not varied (Step S4; NO), after Step S6, or after Step S7, the sheet interval is the normal interval.

The controller 21 controls the continuous conveyance section 22 to superpose the leading end and the trailing end of the sheets (step S8).

Next, the controller 21 controls the laminating section 23 to perform the laminating process by superimposing the film F on the sheets being conveyed (step S9).

Next, the controller 21 controls the cutting section 24 to cut the film F between the overlapped sheets with the film F overlaid thereon to separate the sheets (step S10). At this time, the controller 21 adjusts the movement speed of the cutter 242 in the width direction X in accordance with the conveyance speed of the sheet. Specifically, the controller 21 performs control such that a component in the sheet conveyance direction Y of the movement speed of the cutter 242 along the direction A (see FIG. 3) matches the conveyance speed of the sheets. Accordingly, the controller 21 also adjusts the movement speed of the cutter 242 in the width direction X.

In a case where the sheet interval has not varied in step S4 (step S4; NO), that is, in a case where the interval between the sheets transported from the image forming section 13 is the normal interval, the controller 21 sets the conveyance speed of the plurality of sheets to the normal speed, and sets the movement speed of the cutter 242 in the cutting section 24 to the normal speed. That is, when the distance (interval) between the sheets transported from the image forming section 13 returns to the normal distance from a state in which the distance is not uniform (state in which the distance is not the normal distance), the controller 21 returns the conveyance speed of the plurality of sheets and the movement speed of the cutter 242 to the normal speeds.

After step S10, the controller 21 transmits to the image forming apparatus 10 via the IF section 27 information indicating checking the variation of the sheet interval of one time has been completed.

The controller 11 of the image forming apparatus 10 receives, from the laminating apparatus 20 via the IF section 19, the information indicating that checking the variation of the sheet interval of one time has been completed. The controller 11 determines whether or not the image forming section 13 has completed the image forming operation on all sheets (step S11).

When the image forming operation on all the sheets is not completed (step S11; NO), the process returns to step S2, and the subsequent processes are repeated.

In Step S11, when the image forming operation on all the sheets is completed (Step S11; YES), the sheet interval adjustment process is ended.

The processes (steps) of the sheet interval adjustment process of FIG. 4 are, for the sake of simplicity, have been described to be performed on each sheet, forcing on a sheet and another sheet conveyed next. In practice, since the sheet interval adjustment process is a process to be performed on a plurality of sheets which are continuously conveyed, the processes thereof are performed in parallel.

Further, in the sheet interval adjustment process, the controller 21 aligns the sheet interval to the normal interval in the processes of step S4 to step S7, and then stacks the leading end and the trailing end of the sheets in step S8. However, as long as the controller 21 can finally achieve the state of step S8 (interval or overlap state in which the laminating process can be performed) in accordance with the sheet interval acquired in step S3, steps therebetween are not limited.

Adjustment of an interval(s) between sheets P41 to P44 will be described with reference to FIG. 7A and FIG. 7B. In the drawings, the passage detection sensor 30, the continuous conveyance section 22, and the laminating section 23 are disposed on a straight line and schematically illustrated.

Figures 7A, 7B:
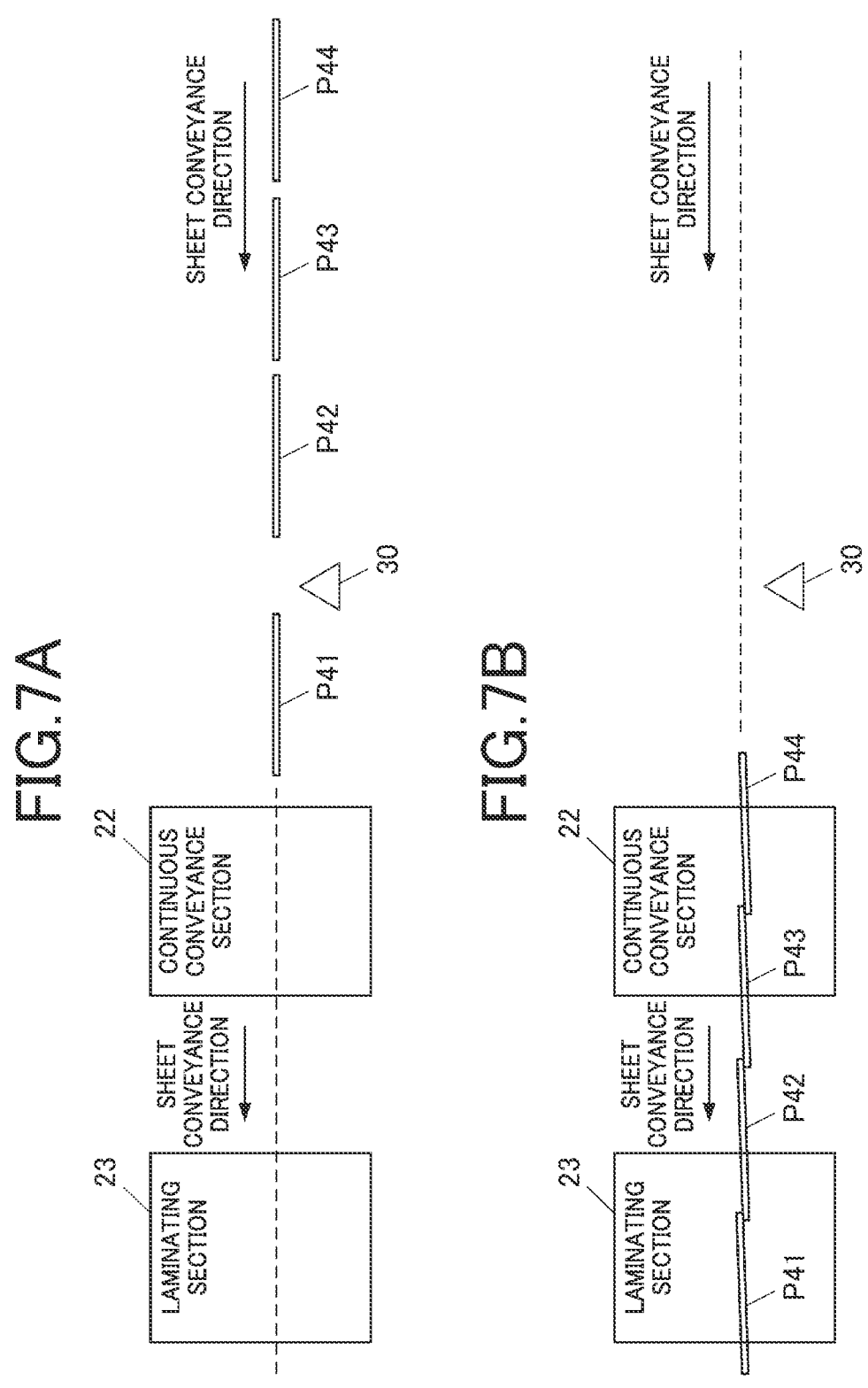
FIG. 7A is a diagram illustrating a state in which sheet intervals are not uniform.
FIG. 7B is a diagram illustrating a state after adjustment of a sheet interval.

As shown in FIG. 7A, in the sheets P41 to P44 conveyed from the image forming section 13 of the image forming apparatus 10, the interval between the first sheet P41 and the second sheet P42 is larger than the normal interval. The intervals between the continuously conveyed sheets are obtained from the detection results of the passage detection sensor 30.

As shown in FIG. 7B, before the laminating process in the laminating section 23, the controller 21 adjusts, in the continuous conveyance section 22, the intervals between the sheets P41 to P44 based on the intervals between the sheets obtained from the detection results of the passage detection sensor 30. The controller 21 adjusts the intervals between the sheets P41 to P44, so that there is no interval between the sheets P41 to P44 when the sheets P41 to P44 each reach the laminating section 23.

For example, the controller 21 decreases the conveyance speed of the first sheet P41 in the continuous conveyance section 22. Thus, the controller 21 adjusts the interval between sheets, and makes the sheets P41 to P44 conveyed in a state where the leading end(s) and the trailing end(s) of the sheets are superposed by a predetermined amount.

Further, the controller 21 may cause the continuous conveyance section 22 to temporarily suspend the conveyance of the first sheet P41 and resume the conveyance of the first sheet P41 when the interval between the first sheet P41 and the second sheet P42 becomes the normal interval.

The adjustment of the sheet interval is not limited to being performed in the continuous conveyance section 22, and may be performed on the sheet conveyance path downstream of the passage detection sensor 30 and upstream of the laminating section 23.

As described above, according to the present embodiment, the controller 21 of the laminating apparatus 20 adjusts the interval between sheets before the laminating process, the interval varying in the image forming section 13, such that the leading end and the trailing end of the sheets conveyed from the image forming section 13 are superposed. Accordingly, the controller 21 can prevent the adhesive of the film F from adhering to a roller or the like on the sheet conveyance path, and can avoid a situation in which the laminating apparatus 20 or the image forming system 1 stops. Therefore, when performing the laminating process on the sheets that are continuously transported, the controller 21 can reliably execute the laminating process on the sheets even in a state in which the interval between sheets varies in the image forming apparatus 10 or the like. Therefore, the controller 21 can suppress a decrease in productivity even in a case where a sudden extension occurs in the interval.

Furthermore, before the laminating process, the controller 21 controls the conveyance speed(s) of the plurality of sheets in accordance with the interval between the sheets during a job such that the leading end and the trailing end of the sheets conveyed from the image forming section 13 are superposed. This allows the controller 21 to reliably execute the laminating process on the sheets even if the interval between the sheets varies in the image forming apparatus 10 or the like when performing the laminating process on the sheets, which are continuously conveyed.

Furthermore, the controller 21 causes the plurality of sheets to be conveyed such that a state changes from a state in which the intervals between the plurality of sheets are not uniform to a state in which the leading ends and the trailing ends of the sheets are superposed before the laminating process. This allows the controller 21 to reliably execute the laminating process on the sheets even if the interval between the sheets varies in the image forming apparatus 10 or the like when performing the laminating process on the sheets, which are continuously conveyed.

Furthermore, the controller 21 can easily adjust the interval between the sheets by adjusting at least one of the conveyance speed of the preceding sheet and the conveyance speed of the following sheet.

For example, the controller 21 can reduce the interval between the sheets by decreasing the conveyance speed of the preceding sheet or increasing the conveyance speed of the following sheet.

Furthermore, the controller 21 can increase the interval between the sheets by increasing the conveyance speed of the preceding sheet or decreasing the conveyance speed of the following sheet.

Furthermore, since the controller 21 adjusts, based on the interval between the preceding sheet and the following sheet, the interval between the sheets, and hence can adjust the interval between the sheets as necessary.

Furthermore, the controller 21 obtains the interval between the sheets based on the detection results of the sheets detected by the passage detection sensor 30, and hence can reflect the actually detected results in the adjustment of the interval between the sheets.

Furthermore, when the controller 21 has adjusted the conveyance speed of the preceding sheet, the controller 21 instructs the cutting section 24 to adjust the movement speed of the cutter 242 in the width direction X of the sheet. Thus, the controller 21 can separate the sheets, which are continuously conveyed, from each other without stopping the conveyance of the sheets.

Furthermore, when the interval between the sheets, which are conveyed from the image forming section 13, has returned to the normal interval, the controller 21 can return the conveyance speed of the plurality of sheets and the movement speed of the cutter 242 to their normal speeds.

In the above-described embodiment, the detection results of the sheets detected by the passage detection sensor 30 are transmitted from the controller 11 of the image forming apparatus 10 to the controller 21 of the laminating apparatus 20. Instead, the controller 21 of the laminating apparatus 20 may directly acquire the detection results from the passage detection sensor 30. FIG. 1 illustrates a case where the passage detection sensor 30 is installed in the image forming apparatus 10. The passage detection sensor 30 may be installed in the laminating apparatus 20 as long as the position is where the passage detection sensor 30 can detect the passage of the sheets, the interval between which varies in the image forming section 13 of the image forming apparatus 10.

Modification Example

Next, a modification example will be described. Hereinafter, differences from the above embodiment will be mainly described.

In the above-described embodiment, the interval between the preceding sheet and the following sheet is acquired based on the detection results of the sheets by the passage detection sensor 30. In the modification example, the controller 21 of the laminating apparatus 20 acquires the interval between the preceding sheet and the following sheet based on information on a process of making the interval between the sheets vary. The "information on a process of changing the interval between the sheets" is not particularly limited as long as the information can specify the process of making the interval between the sheets vary in the image forming section 13.

In the storage section 25 of the laminating apparatus 20, the sheet interval is stored in association with each factor (which is hereinafter referred to as a "sheet interval variation factor") by which the interval between a plurality of sheets that are conveyed from the image forming section 13 of the image forming apparatus 10 varies. That is, in the storage section 25, a theoretical value of the sheet interval for each "process of making the interval between the sheets vary" is stored.

Examples of the sheet interval variation factors include the toner forcible discharge process, the toner concentration adjustment process, the image input delay, and the like.

When the toner forcible discharge process, the toner concentration adjustment process, the image input delay, or the like occurs, the controller 11 of the image forming apparatus 10 transmits the occurred sheet interval variation factor to the laminating apparatus 20 via the IF section 19.

The controller 21 of the laminating apparatus 20 receives the sheet interval variation factor from the image forming apparatus 10 via the IF section 27. The controller 21 obtains (estimates) the interval between the preceding sheet and the following sheet by reading the sheet interval associated with the sheet interval variation factor from the storage section 25.

Operation in the modification example is the same as the sheet interval adjustment process illustrated in FIG. 4. However, in the process of step S3, the controller 21 of the laminating apparatus 20 reads out the sheet interval associated with the sheet interval variation factor from the storage section 25 to obtain the interval between the preceding sheet and the following sheet.

According to the modification example, the controller 21 of the laminating apparatus 20 can acquire the theoretical value of the interval between the preceding sheet and the following sheet by reading, from the storage section 25, a sheet interval associated with a sheet interval variation factor. Therefore, without actually measuring the interval between the preceding sheet and the following sheet, the controller 21 can adjust the interval between the sheets.

Those described in the above embodiment and modification example are examples of the laminating system, the laminating apparatus, and the recording medium according to the present invention, and the present invention is not limited thereto. The detailed configuration and detailed operation of each apparatus constituting the system can be appropriately changed without departing from the scope of the present invention.

For example, in the above embodiment and modification example, the continuous conveyance section 22 superposes the leading end(s) and the trailing end(s) of the sheets that continuously conveyed. Alternatively, the continuous conveyance section 22 may reduce (shorten) the interval between sheets continuously conveyed. The interval between the sheets may be a state in which there is no gap or may be an interval to the extent that the adhesive layer of the film F is not exposed on the opposite side of the sheets.

Specifically, the controller 21 may control the continuous conveyance section 22 to adjust the interval between the sheets, the interval varying in the image forming section 13, before the laminating process such that the interval between the sheets conveyed from the image forming section 13 is reduced.

The controller 21 may control the continuous conveyance section 22 to control the conveyance speed of the plurality of sheets before the laminating process in accordance with the interval between the sheets during the job such that the interval between the sheets conveyed from the image forming section 13 is reduced.

The continuous conveyance section 22 (second conveyance section) is disposed downstream of the conveyance section 16 (first conveyance section) disposed downstream of the image forming section 13 of the image forming apparatus 10 to convey, before the laminating process, a plurality of sheets in a state in which the interval between the sheets conveyed from the first conveyance section is reduced.

In a laminating apparatus that performs the laminating process on both sides of sheets simultaneously, even if there is an interval between sheets that are continuously conveyed, since films on the sides adhere to each other, the adhesive of the film(s) does not adhere to the sheet conveyance path or the like. Therefore, the adjustment of the interval between the sheets, the interval varying in the image forming section 13, before the laminating process is particularly effective in the image forming system 1 including the laminating apparatus 20 that performs the laminating process only on one side of sheets. The interval between the sheets is adjusted such that the leading end(s) and the trailing end(s) of the sheets conveyed from the image forming section 13 are superposed or the interval between the sheets conveyed from the image forming section 13 is reduced.

Alternatively, some sheets may be buffered (temporarily saved) in the sheet conveyance path or in a space into which sheets can evacuate from the sheet conveyance path. Then, in a case where the interval between the sheets is larger than usual, the controller 21 may absorb the difference in the sheet interval by inserting the buffered sheet(s) and performing the laminating process.

Further, in the above embodiment and modification example, the controller 21 of the laminating apparatus 20 adjusts the interval between the sheets before the laminating process. However, the adjustment of the interval between the sheets may be performed by any apparatus of the image forming system 1. For example, the controller 11 of the image forming apparatus 10 may adjust the interval between the sheets.

Further, in the above embodiment and modification example, the controller 21 of the laminating apparatus controls the conveyance speed of a plurality of sheets before the laminating process in accordance with the interval between the sheets. However, the control of the conveyance speed of the sheets in accordance with the interval between the sheets may be performed by any apparatus of the image forming system 1. For example, the controller 11 of the image forming apparatus 10 may control the conveyance speed of the plurality of sheets before the laminating process in accordance with the interval between the sheets.

Further, in the above embodiment and modification example, the controller 11 that controls the image forming apparatus 10 and the controller 21 that controls the laminating apparatus 20 are provided separately in the image forming system 1. However, a controller that controls the entire image forming system 1 may adjust the interval between the sheets and/or control the conveyance speed of the sheets.

Although embodiments of the present invention have been described and illustrated in detail, the disclosed embodiments are made for purposes of illustration and example only and not limitation. The scope of the present invention should be interpreted by terms of the appended claims.

The invention claimed is:

1. A laminating system comprising:
a laminator that performs a laminating process by overlaying a film on a plurality of sheets conveyed; and
a hardware processor that, before the laminating process, adjusts an interval between the sheets, the interval varying in an image former, such that a leading end and a trailing end of the sheets conveyed from the image former are superposed or the interval between the sheets conveyed from the image former is reduced.

2. A laminating system comprising:
a laminator that performs a laminating process by overlaying a film on a plurality of sheets conveyed;
a first conveyor that conveys the plurality of sheets in a state in which an interval between the plurality of sheets during a job for image formation by an image former is not uniform; and
a second conveyor that is disposed downstream of the first conveyor and conveys the plurality of sheets before the laminating process in a state in which a leading end and a trailing end of sheets conveyed from the first conveyor are superposed or in a state in which the interval between the sheets conveyed from the first conveyor is reduced.

3. A laminating system comprising:
a laminator that performs a laminating process by overlaying a film on a plurality of sheets conveyed; and
a hardware processor that controls a conveyance speed of the plurality of sheets before the laminating process in accordance with an interval between sheets during a job such that a leading end and a trailing end of the sheets conveyed from an image former are superposed or the interval between the sheets conveyed from the image former is reduced.

4. The laminating system according to claim 1, wherein the image former forms toner images on the sheets.

5. The laminating system according to claim 1, wherein the interval varies by at least one of a toner forcible discharge process, a toner concentration adjustment process and an image input delay.

6. The laminating system according to claim 1, wherein the hardware processor adjusts at least one of a conveyance speed of a preceding sheet and a conveyance speed of a following sheet, thereby adjusting the interval between the sheets.

7. The laminating system according to claim 3, wherein the hardware processor performs at least one of control to reduce a conveyance speed of a preceding sheet and control to increase a conveyance speed of a following sheet in response to the interval between the preceding sheet and the following sheet being larger than a predetermined interval.

8. The laminating system according to claim 3, wherein the hardware processor performs at least one of control to increase a conveyance speed of a preceding sheet and control to reduce a conveyance speed of a following sheet in response to the interval between the preceding sheet and the following sheet being smaller than a predetermined interval.

9. The laminating system according to claim 1, wherein the hardware processor
obtains an interval between a preceding sheet and a following sheet, and
based on the obtained interval, adjusts the interval between the preceding sheet and the following sheet.

10. The laminating system according to claim 9, wherein the hardware processor obtains the interval between the preceding sheet and the following sheet based on detection results of the preceding sheet and the following sheet by a passage detection sensor disposed on a sheet conveyance path between the image former and where the interval is adjusted.

11. The laminating system according to claim 9, wherein the hardware processor obtains the interval between the preceding sheet and the following sheet based on information on a process of making the interval vary.

12. The laminating system according to claim 1,
wherein one side of the film is provided with adhesive, and
wherein the laminator includes a laminate fixer that applies at least one of heat and pressure to the film and the sheets on which the film is overlaid, thereby uniting the film and the sheets.

13. The laminating system according to claim 1, further comprising a cutting section that is disposed downstream of the laminator and cuts only the film between the sheets with the film overlaid thereon, the sheets being continuously conveyed.

14. The laminating system according to claim 13,
wherein the cutting section cuts the film by inserting a cutter between the sheets continuously conveyed and moving the cutter in a width direction of the sheets, and
wherein the hardware processor adjusts a movement speed of the cutter in the width direction in response to adjusting a conveyance speed of a preceding sheet of the sheets.

15. The laminating system according to claim 14, wherein in response to the interval between the sheets conveyed from the image former returning to a normal interval, the hardware processor returns a conveyance speed of the plurality of sheets and the movement speed of the cutter to normal speeds,
the normal interval is an interval as a distance before the interval is adjusted, and
the normal speeds are speeds before the conveyance speed and the movement speed are adjusted.

16. A laminating apparatus connectable with an image forming apparatus, comprising:
a laminator that performs a laminating process by overlaying a film on a plurality of sheets conveyed; and
a hardware processor that, before the laminating process, adjusts an interval between the sheets, the interval varying in an image former of the image forming apparatus, such that a leading end and a trailing end of the sheets conveyed from the image former are superposed or the interval between the sheets conveyed from the image former is reduced.

17. A laminating apparatus connectable with an image forming apparatus, comprising:
a laminator that performs a laminating process by overlaying a film on a plurality of sheets conveyed; and
a hardware processor that controls a conveyance speed of the plurality of sheets before the laminating process in accordance with an interval between sheets during a job such that a leading end and a trailing end of the sheets conveyed from an image former of the image forming apparatus are superposed or the interval between the sheets conveyed from the image former is reduced.

* * * * *